United States Patent [19]

Wakimoto

[11] Patent Number: 4,747,106
[45] Date of Patent: May 24, 1988

[54] PARITY CHECKER CIRCUIT

[75] Inventor: Akihiko Wakimoto, Takarazuka, Japan

[73] Assignee: Mitsubishi Denki Kabushiki Kaisha, Japan

[21] Appl. No.: 793,293

[22] Filed: Oct. 31, 1985

[30] Foreign Application Priority Data

Nov. 1, 1984 [JP] Japan ................. 59-230843

[51] Int. Cl.$^4$ ........................................... G06F 11/10
[52] U.S. Cl. ..................................................... 371/49
[58] Field of Search ................. 371/49, 51; 364/738, 364/200 MS File, 900 MS File; 307/239, 440, 442, 471

[56] References Cited

U.S. PATENT DOCUMENTS

| | | | |
|---|---|---|---|
| 2,848,607 | 8/1958 | Maron | 371/49 X |
| 3,024,444 | 3/1962 | Barry | 371/49 |
| 3,250,900 | 5/1966 | Diamant | 371/49 |
| 4,346,474 | 8/1982 | Sze | 371/49 |
| 4,538,271 | 8/1985 | Kohs | 371/49 |

FOREIGN PATENT DOCUMENTS 55-15610 2/1980 Japan .
59-48421 11/1984 Japan .

OTHER PUBLICATIONS

F. F. Sellers, "Error Detecting Logic for Digital Computers", 1968, pp. 64 and 65.

Primary Examiner—Jerry Smith
Assistant Examiner—Robert W. Beausoliel, Jr.
Attorney, Agent, or Firm—Leydig, Voit & Mayer

[57] ABSTRACT

A parity checker circuit for performing a parity check in the serial transfer of data in an integrated circuit having an odd or even decision circuit receiving sequential bits constituting a data stream and generating an output signal having a level which becomes high or low and representing whether the number of "1" or "0" in the data is odd or even, and a parity flag circuit connected to receive the output signal from the decision circuit and operable in accordance with a write signal received simultaneously with the high or low level output signal and, in response to these signals, for outputting a parity flag indicative of the parity of the data.

2 Claims, 2 Drawing Sheets 4,747,106

PARITY CHECKER CIRCUIT

BACKGROUND OF THE INVENTION

The present invention relates to a parity checker circuit used in case that data in an integrated circuit are serially transferred.

According to a conventional parity checker circuit of this type, a selection bit for selecting a parity enable bit, an odd or even parity is provided. When a parity is detected, odd or even parity is detected, and if it is coincidence, an error flag is set.

In the above-mentioned conventional parity checker circuit, a problem arises in that its circuit area becomes excessively large, and the size of the chip of its integrated circuit increases.

SUMMARY OF THE INVENTION

The present invention is directed to solve the problems pointed out above, and has for its object to provide a parity checker circuit capable of reducing the size of the chip of an integrated circuit as small as possible.

According to the present invention, there is provided a parity checker circuit for performing a parity check in the serial transfer of data in an integrated circuit comprising an odd or even decision circuit receiving sequential bits constituting a data stream and generating an output signal having a level which becomes high or low after reception of the data stream and representing whether the number of "1" or "0" in the data is odd or even, and a parity flag circuit connected to receive the output signal from said decision circuit and operable in accordance with a write signal received simultaneously with the high or low level output signal and, in response to said signals, for outputting a parity flag indicative of the parity of the data stream.

DESCRIPTION OF THE PREFERRED EMBODIMENTS

Figure 1:
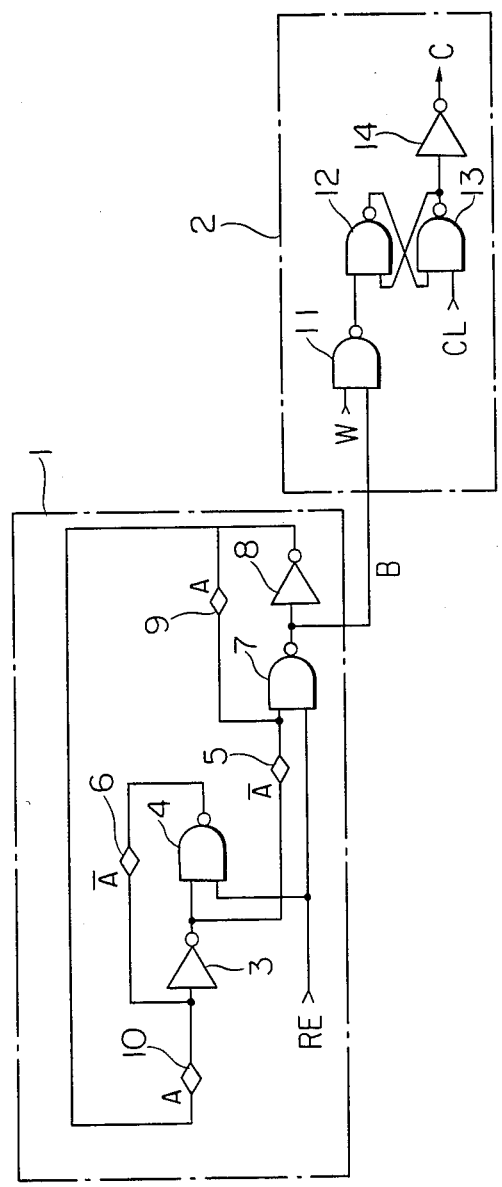
FIG. 1 is a circuit showing a parity checker circuit according to an embodiment of the present invention.

FIG. 1 shows an embodiment of the present invention. Numeral 1 designates an odd or even decision circuit varying according to the number of "1" bits of received data, and numeral 2 designates a parity flag circuit receiving an output signal from the odd or even decision circuit 1. Numerals 3 and 8 designate inverters, and numeral 4 and 7 designate 2-input NAND gates. Numerals 5, 6, 9 and 10 designate transmission gates, which are controlled ON or OFF according to a signal A or its complementary signal $\overline{A}$.

The output of the inverter 3 is connected to the input of NAND gate 4, and also connected to the transmission gate 5. The transmission gate 5 becomes an ON state when the signal $\overline{A}$ is "1" to connect the output of the inverter 3 to the one input of the NAND gate 7. The transmission gate 5 becomes an OFF state when the signal $\overline{A}$ is "0".

Another input of the NAND gate 4 is connected to a reset signal RE, and the output of the NAND gate 4 is connected to the transmission gate 6. The transmission gate 6 becomes an ON state when the signal $\overline{A}$ is "1" to connect the output of the NAND gate 4 to the input of the inverter 3. The transmission gate 6 becomes an OFF state when the signal $\overline{A}$ is "0".

Another one input of the NAND gate 7 is connected to the reset signal RE, and the output of the NAND gate 7 is connected to the input of the inverter 8. The output of the inverter 8 is connected to the transmission gate 9. The transmission gate 9 becomes an ON state when the signal A is "1" to connect the output of the inverter 8 to the input of the NAND gate 7. The transmission gate 9 becomes an OFF state when the signal A is "0". The output of the inverter 8 is also connected to the transmission gate 10. The transmission gate 10 becomes an ON state when the signal A is "1" to connect the output of the inverter 8 to the input of the inverter 3. The transmission gate 10 becomes an OFF state when the signal A is "0".

Numerals 11, 12 and 13 designate 2-input NAND gates, and the NAND gates 12 and 13 construct a flip-flop. Numeral 14 designates an inverter. Character B designates the output of the NAND gate 7, which is connected to the input of the NAND gate 11. To another one input of the NAND gate 11 is inputted a write signal W, and the output is connected to the input of the NAND gate 12. Another one input of the NAND gate 12 is connected to the output of the NAND gate 13, and the output of the NAND gate 12 is connected to the one input of the NAND gate 13. To the other one input of the NAND gate 13 is connected a clear signal CL. The output of the NAND gate 13 is connected to the input of the inverter 14. Character C designates the output of the inverter 14, which is a parity flag.

Figure 2:
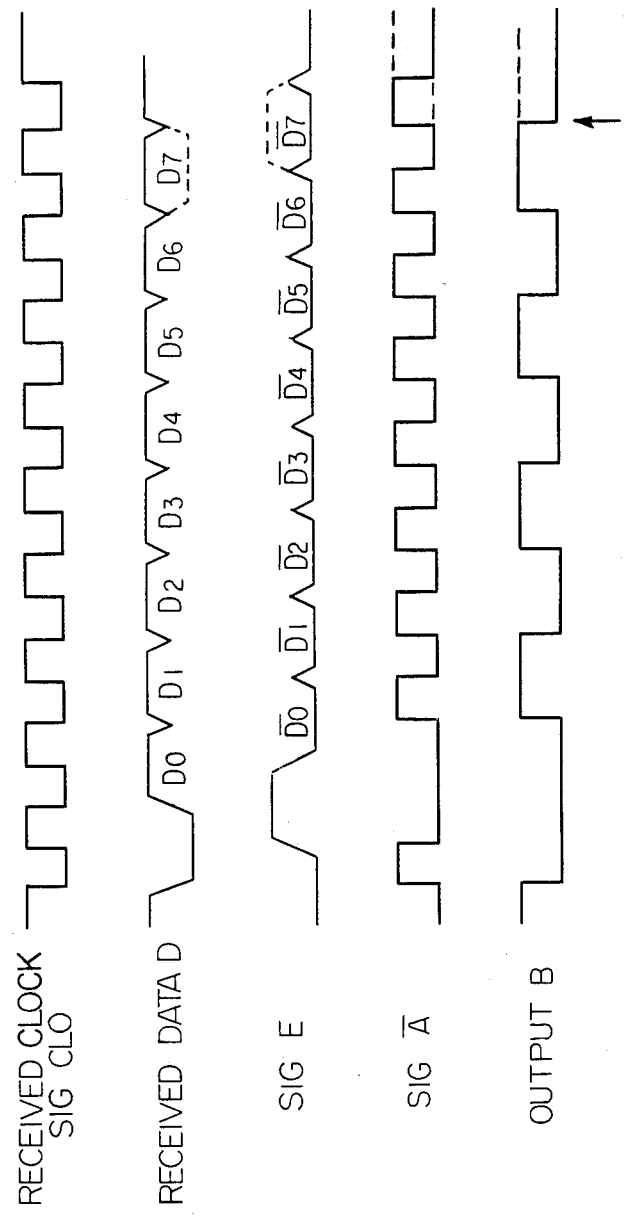
FIG. 2 is a timing chart for explaining the operation of the embodiment of FIG. 1.

FIG. 2 is a timing chart for explaining the operation of the embodiment in FIG. 1. In FIG. 2, data D is 8-bit data having a "0" level start bit. These 8 bits are represented by $D_0$ to $D_7$ and illustrated to be all "1" bits in this case. Character CLO designates a received clock signal, character E designates a signal produced by inverting the received data D by delaying the data by a half cycle, character $\overline{A}$ has an inverted relationship to the signal A as described above, and is produced by taking a NOR of the signal E and the received clock signal CLO.

The received clock signal CLO falls from "1" to "0" in accordance with the start bit of the data D to start the operation and to stop the operation according to "1" when the reception of the data D is completed. Further, the received data D maintains "1" state when not received, the reception is started when receiving the start bit of "0" from "1", and 8 bits after the start bit are data. The output B is "1" since the reset signal RE is normally "0", and varies at every rise of the signal $\overline{A}$ when the signal RE becomes "1".

The operation of the embodiment of the parity checker circuit will be described.

The example of reception of data will be first considered.

When the reception of data is started, the clear signal CL once falls to "0", and then immediately becomes "1". The write signal W is a signal for writing the received data in the data bus of the integrated circuit, generates a pulse becoming "1" only when the reception is completed, and normally becomes "0". Thus, when the reception is started, the parity flag C is "0" at least until the reception is completed.

The reset signal RE is normally "0", becomes "1" when the reception is started, and remains "1" until the reception is completed. Therefore, the output B of the NAND gate 7 becomes "1" when the reception is started.

However, the signal $\overline{A}$ is normally "0", and whenever the received data is "1", it generates a pulse from "0" to "1", and the signals A and $\overline{A}$ have an inverted relationship as described above.

The signal B alters from "1" to "0" or "0" to "1" at every rise of the signal $\overline{A}$ from "0" to "1".

As shown, since the number of pulses of the signal $\overline{A}$ is the number of "1" bits of the received data, the signal B becomes "1" when the number of "1" of the received data is odd. Since the write signal W becomes "1" simultaneously when the reception is completed, the parity flag C becomes "1". Further, when the number of "1" of the received data is even, the signal B becomes "0". Therefore, even the write signal W simultaneously becomes "1" when the reception is simultaneously completed, the parity flag C does not alter but remain "0".

More particularly, since 8 bits of the data D are all "1" in this embodiment, the number of "1" becomes even, the parity flag C becomes "0", if the number of "1" of the 8 bits becomes odd such as, for example, the last bit $D_7$ is "0", "1" of the signal $\overline{A}$ becomes less by one. Therefore, the output B becomes "1" as designated by a broken line in FIG. 2, and the parity flag C becomes "1".

When the number of "1" of the received data is odd immediately after the received data is completely received as described above, the parity flag C is "1". When the number of "1" is the received data is even, the parity flag C can remain "0". As a result, the parity check can be performed by such a parity flag C.

The foregoing description has been of an example of reception of data. The parity check can be performed by a similar circuit in the case of transmission of data. For example, when the write signal W is completely transmitted as a transmission completion signal, a pulse becoming "1" may be simultaneously generated. Further, the signal $\overline{A}$ may be a signal for generating a pulse from "0" to "1" whenever the transmitted data is "1". In addition, in both the reception and the transmission of data, when the number of "1" or "0" in the transferred data is odd, the parity flag C is set to "1" and when the number of "1" or "0" is even, it is set to "1" and in both cases, it can be readily performed by a similar circuit.

According to the present invention as described above, since the parity checker circuit of the invention comprises an odd or even decision circuit for deciding the odd or even of the number of "1" or "0" in the data and the parity flag circuit for outputting the parity flag in response to the content of the odd or even decision circuit, the circuit area of the integrated circuit can be remarkably reduced, and the size of the chip of the integrated circuit having the parity checker mechanism can be substantially reduced.

What is claimed is:

1. A parity checker circuit for performing a parity check in the serial transfer of data in an integrated circuit comprising an odd or even decision circuit including a pair of feedback logic circuits, each comprising a plurality of logic gates and a transmission gate, said transmission gate being operable in accordance with said data stream so as to open or close said feedback logic circuits, wherein said odd or even decision circuit provides means for receiving sequential bits constituting a data stream and generating an output signal having a level which becomes high or low after reception of the data stream and representing whether the number of "1" or "0" in the data is odd or even, and a parity flag circuit connected to receive the output signal from said decision circuit and operable in accordance with a write signal received simultaneously with the high or low level output signal and, in response to said signals, for outputting a parity flag indicative of the parity of the data stream.

2. A parity checker circuit according to claim 1 further comprising means connected to said feedback logic circuits and operable in cooperation with said transmission gates for generating said output signal.

* * * * *